April 12, 1955  D. E. HERVEY  2,706,164
LAMINATED PANEL
Filed Jan. 17, 1951

INVENTOR.
D. E. HERVEY
BY
A. Yates Dowell
ATTORNEY

United States Patent Office 2,706,164
Patented Apr. 12, 1955

2,706,164

LAMINATED PANEL

David E. Hervey, Hertford, N. C.

Application January 17, 1951, Serial No. 206,475

1 Claim. (Cl. 154—45.9)

This invention relates to a novel article of manufacture and an improved method of making the same, and more particularly to a framework or core structure, useful in various phases of building construction, such as forming doors, walls and other panels, and also in the construction of desk and table tops or the like.

Laminated doors and panels have previously been constructed by forming a framework of individual strips of wood, cut to the proper shape and size, and secured together by nailing, gluing, or other suitable means to provide a core of lattice work construction and then applying sheets of plywood to the opposite faces of the core to form a laminated panel. However, this previous construction required a relatively large amount of time and labor for the construction of each individual door. A very careful and accurate construction by skilled artisans is necessary and the completed door is liable to twist and warp.

One object of the present invention is to provide a novel method of forming a plurality of cores in a quick, simple and inexpensive manner, which overcomes the disadvantages enumerated above.

Another object of the present invention is to provide an improved method of manufacturing a laminated door or other panel including the formation of a plurality of cores by building up and adhesively securing in assembled relation a composite structure of specially selected and arranged pieces of wood, sawing or slicing in any suitable manner the structure thus formed into a plurality of lattice-like cores of uniform and accurate dimensions, and adhesively securing one or more sheets of veneer to the opposite faces of the core.

A further object of the present invention is to provide an improved laminated door or panel construction consisting of a composite lattice-like core with one or more sheets of veneer applied to the opposite faces thereof wherein the grain of the wood extends in three dimensions to eliminate or minimize twisting and warping of the completed door or panel.

Still another object of the present invention is to provide an improved lattice-like core for veneering with a particular novel and advantageous arrangement of the individual pieces forming the core.

Figure 1:
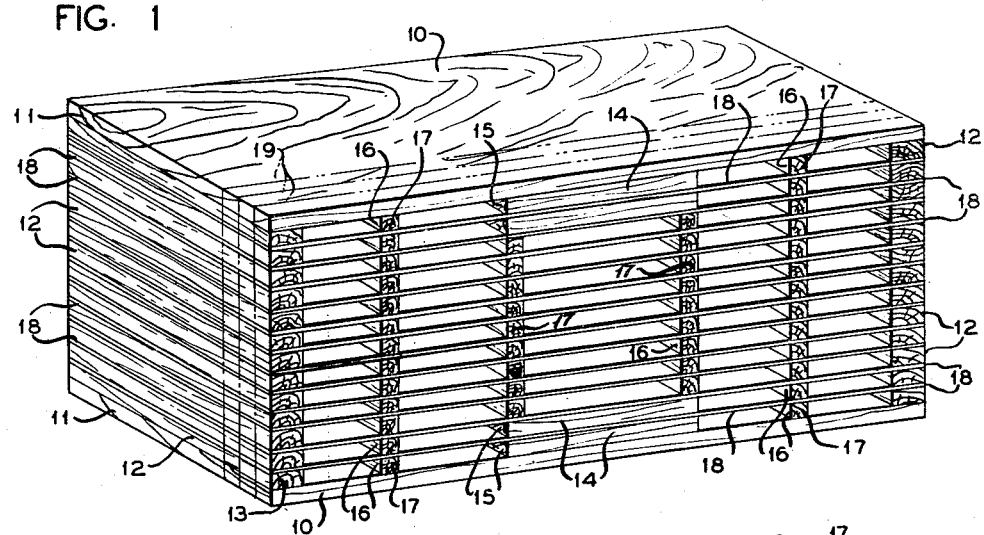
Figure 2:
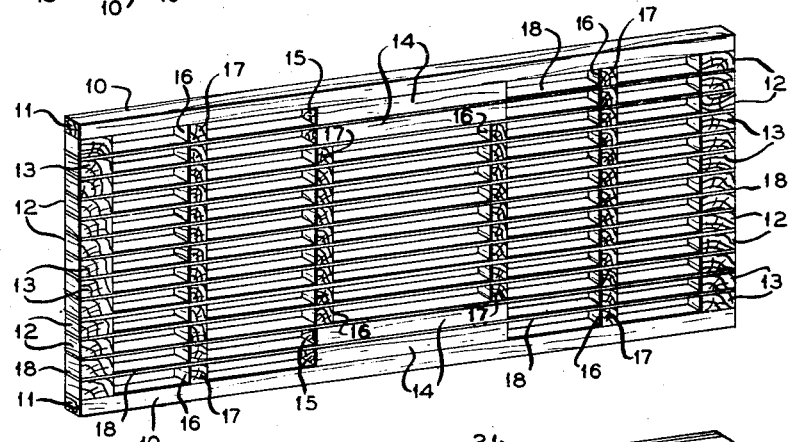
Figure 3:
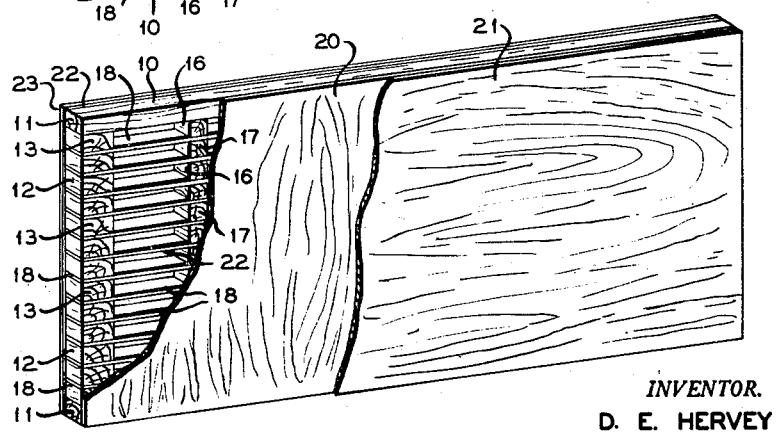

Further objects and advantages of the invention will be apparent from the following description taken in conjunction with the accompanying drawings, wherein:

Fig. 1 is a perspective view of one preferred arrangement of the pieces of wood forming the composite structure from which the plurality of lattice-like cores are subsequently formed;

Fig. 2, a perspective view of one of the lattice-like cores formed from the composite structure shown in Fig. 1; and Fig. 3, a perspective view with portions broken away showing a door or other similar panel which may be formed from the core shown in Fig. 2.

Referring now to the drawings in detail, the composite structure shown in Fig. 1 is fabricated by building up a series of layers as illustrated on the bed of a press (not shown).

A large slab 10 of wood is first laid on the bed of the press, the length of the slab being equal to the height of the desired door or other panel. The slab 10 may be of any desired width, but is preferably some multiple of the thickness of the desired cores plus a suitable allowance for the number of sawcuts required. The grain of the slab 10 preferably extends lengthwise with the end grain on the surface 11. Slab 10 is of substantial thickness, preferably about two inches, and may preferably consist of one solid integral piece of wood of the desired dimensions or may be laminated or made up from a number of elongated planks laid side by side.

The end blocks 12 are preferably two by fours of a suitable length equal to the width of the slab 10 and placed flush with the ends of the slab 10. The grain of the end blocks 12 extends lengthwise of the piece or transversely of the structure with the end grain on the surface 13. A relatively wide block 14 is positioned centrally across slab 10 and has its grain parallel to the grain of the slab 10 with the end grain on the surface 15. The center block 14 is preferably about two inches by 24 inches and forms one of the lock blocks in the completed core. One or more spacing strips 16 are positioned between the end blocks 12 and the center block 14. The grain in the spacing strips 16 preferably extends lengthwise of the piece or transversely of the structure with the end grain on the surface 17.

On top of the blocks 12, 14 and 16 is placed a relatively thin sheet 18 of wood veneer or the like preferably about ⅜ of an inch in thickness. The sheet 18 is relatively thin with respect to the thickness of slab 10 and is continuous from one end of the panel to the other for increasing the strength and rigidity thereof. On top of the sheet 18 is laid another series of pieces consisting of end blocks 12, center block 14, and spacing strips 16 on which is placed another sheet of veneer or plywood 18. The second sheet of plywood preferably has the grain extending at right angles to the first sheet which in turn has its grain preferably at right angles to slab 10, but in parallel planes. On top of the second sheet 18 is placed a series of end blocks 12 and spacing strips 16 with two of the spacing strips 16 positioned with their edges in alignment with the ends of the center blocks 14, as shown. A plurality of similar layers are built up, as shown in Fig. 1, with two more center blocks 14 positioned adjacent the top of the structure, and a final slab 10 is placed on top.

A layer of adhesive is applied to each of the abutting surfaces of the pieces during the formation of the composite structure, and the top of the press (not shown) is brought down to exert pressure on the top slab 10 to exert pressure on the entire structure until the adhesive has adequately dried and set. The adhesive used during this stage of manufacture may be of either a permanent or a temporary type just sufficient to hold the pieces together during the subsequent sawing operation.

The composite structure is next divided lengthwise by sawing or otherwise severing along the dotted lines 19, as shown in Fig. 1, to form a plurality of lattice-like cores, as shown in Fig. 2.

The next step in the operation is to apply one or more sheets of plywood to the opposite faces of the core to form a completed door or panel, as shown in Fig. 3. In the preferred construction shown, one sheet of veneer 20 with its grain extending transversely has both of its faces coated with adhesive and is applied to the adhesive-coated surface of the core. Another sheet of veneer 21 with its grain extending longitudinally has its inner surface coated with adhesive and is applied to sheet 20. In this operation, it is desirable to use a permanent type of adhesive such as a waterproof glue. Additional sheets of veneer 22 and 23 are adhesively secured to the opposite face of the core, and a plurality of panels thus fabricated may be stacked up and placed in a press under pressure until the adhesive is properly set.

It will be apparent that the portions severed from the slabs 10 will form the upright edges of the completed door or panel and the bottom and top edges will be formed with laminations consisting of portions of the end blocks 12, sheets 18, and the ends of the slabs 10. In the construction illustrated which is particularly suited for doors, the center blocks 14 are located in the proper position for the insertion and support of locks and/or handles which will be required in the completed structure when installed. For this reason, the grain extends as shown to provide the maximum strength for supporting and holding the screws utilized in attaching the locks and door handles. If the panels are to be used for other purposes, suitable blocks similar to center blocks 14 may be provided wherever desired, for instance in a position to support switches, lighting fixtures or other cooperating structural elements.

If desired, the adhesive may be left out between the continguous surfaces of one of the sheets 18 and the adjacent layer of end blocks 12 and spacing strips 16, or two sheets of veneer or plywood 18 without adhesive therebetween may be positioned between two of the layers of end blocks 12 and spacing strips 16, so as to divide the composite structure into two separable portions of different heights. In this manner it will be possible by making the lower section, for instance, 24 inches in height and the upper section 18 inches in height to combine two of the upper sections to form a core for a 36 inch panel or door, and two of the lower sections may be combined to form the core for a 48 inch door or panel. An upper and a lower section may be combined to form an intermediate sized 42 inch door or panel.

It will be apparent that a relatively thin sheet of veneer or other material can be substituted for the relatively thick slab 10 and a number of intermediate core sections of different widths produced which may be combined with core sections made from the relatively thick slabs 10 and with lock blocks 14 to produce a door or panel of any desired width.

In another use of the present invention the slabs 10 and end blocks 12 may be left out to form a skelton core which can be inserted and secured within a rectangular frame made from relatively thick heavy members, such as two by fours, to form a completed core to which the sheets of veneer may be applied.

While the present invention has been particularly described with reference to wooden slabs, wood blocks, spacing strips, and sheets of veneer formed from wood, it will be apparent that other equivalent materials may be used, such as sheets of composition board and blocks of pressed wood, plastic, or other composition material. The structure can obviously be modified in many ways to suit the particular purpose for which the panel is to be used.

It will be apparent that the method of forming a laminated door in accordance with the present invention will be very simple and inexpensive, can be carried out by relatively unskilled labor, and will form a novel door or panel of greatly improved strength and utility.

It will be obvious to those skilled in the art that various changes may be made in the invention without departing from the spirit and scope thereof and, therefore, the invention is not limited by that which is shown in the drawings and described in the specification, but only as indicated in the appended claim.

What is claimed is:

A panel structure comprising spaced elongated wooden edge members of substantial width and thickness and each having its grain extending in a longitudinal direction, a plurality of wooden blocks between and in contact with one of said edge members and secured thereto by adhesive with the grain of each of said blocks extending transversely to the length of the edge members, a thin wooden strip of the width and length of said edge members and of appreciably less thickness than said edge members and secured to blocks, and additional thin strips and spacing blocks similarly arranged to provide a lattice work structure, at least one sheet of wood having its grain extending transverse to the grain of said edge member on one surface of the core and secured to the edges of said edge members and said thin strips and the ends of said blocks and secured thereto by an adhesive thereby providing a permanent strong and light-weight panel.

References Cited in the file of this patent

UNITED STATES PATENTS

| | | |
|---|---|---|
| 435,337 | Wassenius | Aug. 26, 1890 |
| 1,356,764 | Henderson | Oct. 26, 1920 |
| 1,394,119 | Rockwell | Oct. 18, 1921 |
| 2,361,733 | Bartholomew | Oct. 31, 1944 |
| 2,385,352 | Davis | Sept. 25, 1945 |